(12) United States Patent  
Tang et al.

(10) Patent No.: US 9,152,663 B2  
(45) Date of Patent: Oct. 6, 2015

(54) FAST APPROACH TO FINDING MINIMUM AND MAXIMUM VALUES IN A LARGE DATA SET USING SIMD INSTRUCTION SET ARCHITECTURE

(71) Applicants: Li-An Tang, El Dorado Hills, CA (US); Shih-Hsuan Hsu, Campbell, CA (US)

(72) Inventors: Li-An Tang, El Dorado Hills, CA (US); Shih-Hsuan Hsu, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 13/853,589

(22) Filed: Mar. 29, 2013

(65) Prior Publication Data

US 2014/0280189 A1    Sep. 18, 2014

Related U.S. Application Data

(60) Provisional application No. 61/798,288, filed on Mar. 15, 2013.

(51) Int. Cl.
*G06F 17/30* (2006.01)
*G06F 7/22* (2006.01)

(52) U.S. Cl.
CPC ............ *G06F 17/30336* (2013.01); *G06F 7/22* (2013.01)

(58) Field of Classification Search
CPC ................... G06F 17/30864; G06F 17/30321; G06F 17/30613
USPC ................... 707/741, 743, 803; 711/108, 119
See application file for complete search history.

(56) References Cited

U.S. PATENT DOCUMENTS

| | | | |
|---|---|---|---|
| 6,341,296 B1 | 1/2002 | Menon | |
| 6,633,953 B2* | 10/2003 | Stark | 711/108 |
| 8,417,735 B1* | 4/2013 | Stratton | 707/803 |
| 2007/0230791 A1* | 10/2007 | Chellapilla et al. | 382/188 |
| 2010/0114905 A1* | 5/2010 | Slavik et al. | 707/743 |
| 2012/0239706 A1* | 9/2012 | Steinfadt | 707/803 |
| 2013/0013862 A1* | 1/2013 | Kannan et al. | 711/119 |

FOREIGN PATENT DOCUMENTS

WO    03/056421 A2    7/2003

OTHER PUBLICATIONS

Extended European Search Report Received for European Patent Application No. 14159790.6, mailed on Jun. 13. 2014, 7 pages.
Intel, "Integer Minimum or Maximum Element Search Using Streaming SIMD Extensions", AP-804 Integer Min/Max Search, Version 2.1, Jan. 27, 1999, 15 Pages.

\* cited by examiner

*Primary Examiner* — Mariela Reyes
*Assistant Examiner* — Thong Vu
(74) *Attorney, Agent, or Firm* — Jordan IP Law, LLC

(57) ABSTRACT

Systems and methods may determine a boundary value data unit in a large data set in parallel with determining an associated index of the determined boundary value data unit into the large data set using a single instruction multiple data (SIMD) instruction set architecture and a specialized data layout of array entries. In one example, the specialized data layout of array entries combines a data value and its associated index to an array into a single array entry.

23 Claims, 7 Drawing Sheets

15

Arrays[0:N]

MSB     LSB

401a  declare dataIndexArray[N],
       For N = 16 *
402a   declare minArray[16], maxArray[16], 403a   min(16) minArray[0:15] dataIndexArray[0:15] dataIndexArray[16:31]
       max(16) maxArray[0:15] dataIndexArray[0:15] dataIndexArray[16:31]

for (i=2; i<N/16; i++) { min(16) minArray [0:15]  dataIndexArray [i*16: i*16+15] minArray[0:15]
       max(16) maxArray [0:15]  dataIndexArray [i* 16: i*16 +15] maxArray[16:31]
404a   }

405a   min(8) minArray[0:7]  minArray[0:7]  minArray [8:15]
       max(8) maxArray [0:7]  maxArray[0:7]  maxArray[8:15]

406a   min(4) minArray[0:3]  minArray[0:3]  minArray [4:7]
       max(4) maxArray [0:3]  maxArray[0:3]  maxArray[4:7]

407a   min(2) minArray[0:1]  minArray[0:1]  minArray [2:3]
       max(2) maxArray [0:1]  maxArray[0:1]  maxArray[2:3]

408a   min(1) minArray[0]  minArray[0]  minArray [1]
       max() maxArray [0]  maxArray[0]  maxArray[1]

min(1) minArray[0]
       max(1) maxArray[0]

FIG. 4A

FAST APPROACH TO FINDING MINIMUM AND MAXIMUM VALUES IN A LARGE DATA SET USING SIMD INSTRUCTION SET ARCHITECTURE

CROSS-REFERENCE TO RELATED APPLICATIONS

The present application claims the benefit of priority to U.S. Provisional Patent Application No. 61/798,288 filed on Mar. 15, 2013.

FIELD OF THE INVENTION

Embodiments described herein generally relate to data processing for large data sets, and more particularly to processing large data sets using single instruction multiple data (SIMD) processors.

BACKGROUND

Single instruction multiple data (SIMD) processors are generally used in applications that exhibit massive amounts of data parallelism without complicated control flow or excessive amounts of inter-processor communication. Typical applications for SIMD processors may include low-level vision and image processing, such as, for example, pattern recognition, database searches, and statistic analysis. One common operation involved in image processing is to find the minimum or maximum value and its associated index into a large data array. Most SIMD processors provide instructions that may quickly perform the minimum and maximum operations. However, if the SIMD processors have to keep track of the indices that produce these values, the data parallelism of SIMD instructions may be broken.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 4A-4B are diagrams of examples of SIMD instruction listings and block diagrams according to an embodiment.

DETAILED DESCRIPTION

Figure 1:
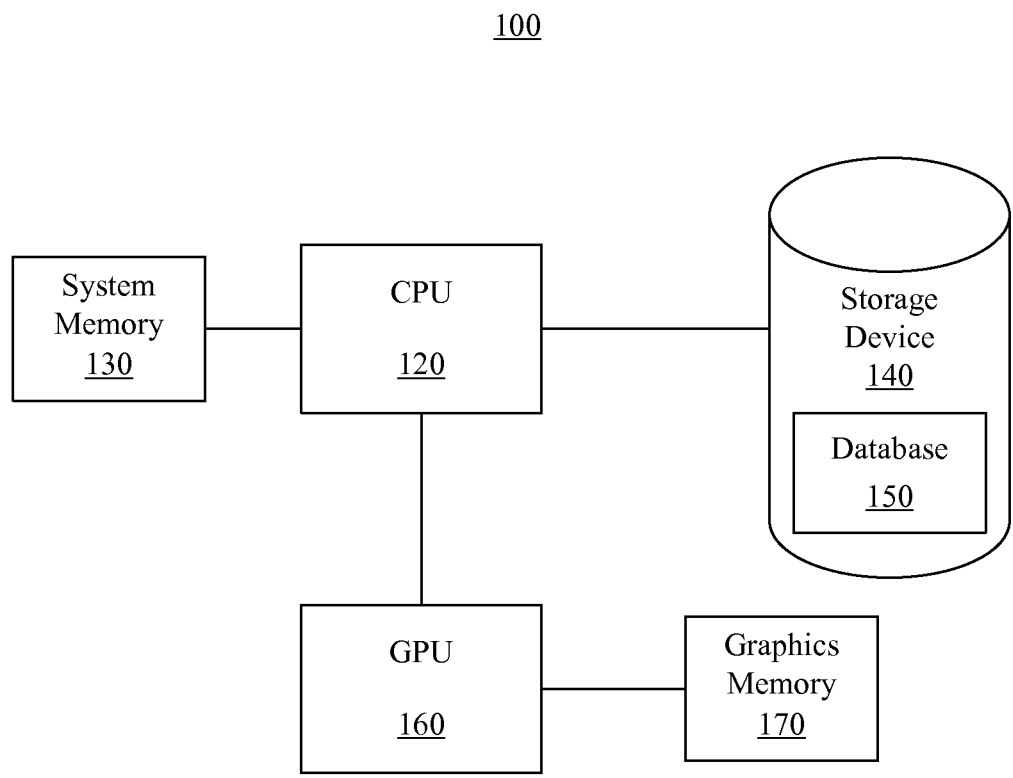
FIG. 1 is a block diagram of an example of a computing system according to an embodiment.

Turning now to FIG. 1, a computing system 100 is shown, including a central processing unit (CPU) 120, system memory 130, storage device 140, including database 150, a graphics processing unit (GPU) 160 and graphics memory 170. The illustrated system 100 may be part of a mobile platform such as a laptop, personal digital assistant (PDA), wireless smart phone, media player, imaging device, mobile Internet device (MID), smart tablet etc., or any combination thereof. The system 100 may also be part of a fixed platform such as a personal computer (PC), server, workstation, etc.

The CPU 120 may include a memory controller (not shown) that provides access to system memory 130, which may include random access memory, such as, for example, dual data rate (DDR) synchronous dynamic random access memory modules. The modules of the system memory 130 may be incorporated into a single inline memory module (SIMM), dual inline memory module (DIMM), small outline DIMM (SODIMM), and so on. The CPU 120 may also have one or more drivers and/or processor cores (not shown), where each core may be fully functional with instruction fetch units, instruction decoders, level one (L1) cache, execution units, and so on. The CPU may include one or more single instruction multiple data (SIMD) processor cores. The CPU 120 may also execute an operating system (OS) such as a Microsoft Windows, Linux, or Mac (Macintosh) OS.

The storage device 140 may be implemented with a variety of components or subsystems including, for example, a magnetic disk drive, an optical drive, flash memory, or other devices capable of persistently storing information. As illustrated in FIG. 1, storage device 140 includes database 150, which stores a large data set.

The illustrated system 100 also includes a graphics processing unit (GPU) 160 coupled to graphics memory 170. The dedicated graphics memory 170 may include GDDR (graphics DDR) or DDR SDRAM modules, or any other memory technology suitable for supporting graphics rendering. The GPU 160 and graphics memory 170 might be installed on a graphics/video card, wherein the GPU 160 may communicate with the CPU 120 via a graphics bus such as a PCI Express Graphics (PEG, e.g., Peripheral Components Interconnect/PCI Express x16 Graphics 15 0W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 120 die, configured as a discrete card on the motherboard, etc.

The illustrated GPU 160 executes a software module as part of a graphics application. The graphics application may need to determine the minimum or maximum value in a large data set and its associated index to the large data array. In one example, the software module includes code to determine the minimum or maximum value in a large data set in parallel with determining the value's associated index into the large data array.

The software module might also include code for combining a data value and an associated index of the data value into a single data unit for storage as a data entry in the large data set. The software module may be written in any programming language, such as, for example, an object-oriented language such as C++.

The GPU 160 may also include one or more single instruction multiple data (SIMD) processor cores to enhance and/or support graphics performance. Thus, the illustrated approach may be particularly beneficial in a graphics environment that involves a high level of data parallelism and processing complexity.

Figure 2A:
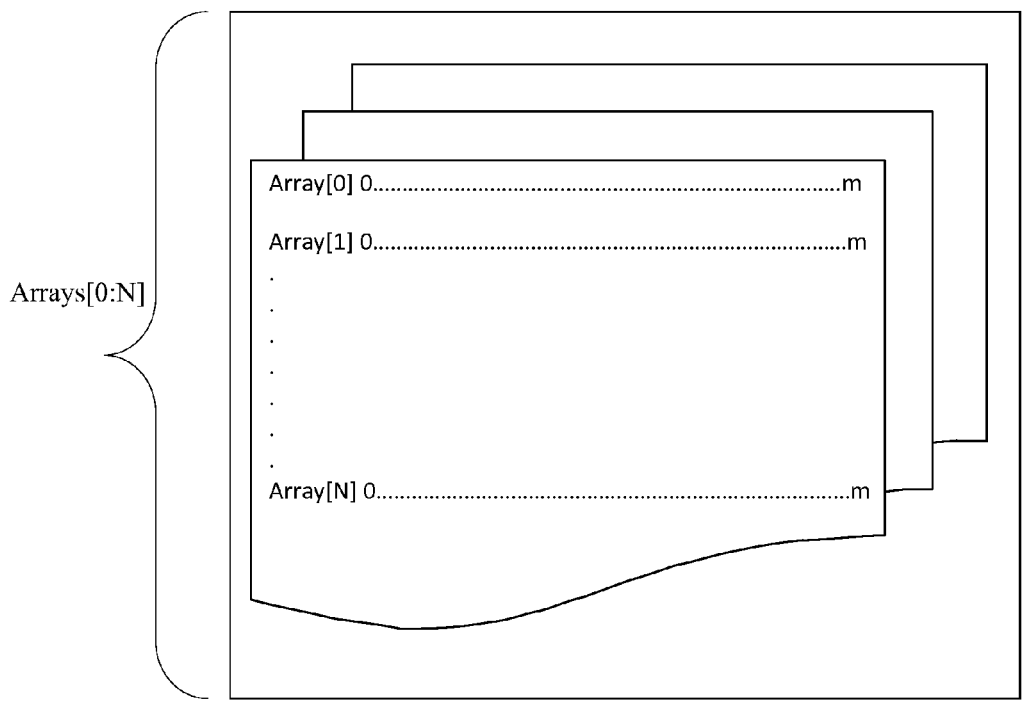
FIGS. 2A-2B are diagrams of examples of a large data set and the data layout of the large data set according to an embodiment.
Figure 2B:

Turning now to FIG. 2A, a large data set is illustrated, where the large data set includes an array data structure. Each entry in the illustrated array has a specialized data layout including a data value and its associated index to the large data set, as shown in FIG. 2B. The data value is stored in the most significant bits of the data entry, and the index is stored in the least significant bits of the data entry.

The software module may construct and assemble the specialized data layout of the large data set by executing, for example, the following code, where N=16:

```
declare dataArray[N];
Const IndexArray[16] = {0, 1, 2, 3, 4, 5, 6, 7, 8, 9, 10, 11, 12, 13, 14, 15};
add (16) acc[0:15]    IndexArray[0:15]    0
mac (16) dataIndexArray[0:15]  dataArray[0:15]     65536
add (16) acc[0:15]    IndexArray[0:15]    16
mac (16) dataIndexArray[16:31] dataArray[16:31]    65536
```

The specialized data layout of the data entries may be constructed by combining the data value and its index into a single data entry. The software module may construct and assemble the specialized data layout of the large data set by executing two SIMD 16 instructions for every 16 incoming data units. For example, for the first 16 data units, the software module may execute add(16) acc[0:15] IndexArray[0:15] 0; and mac(16) dataIndexArray[0:15] dataArray[0:15] 65536, and for the second data units, the software modules may execute add(16) acc[0:15] IndexArray[0:15] 16; and mac(16) dataIndexArray[16:31] dataArray[16:31] 65536.

The SIMD16 instructions perform the same operation on sixteen data channels in parallel. SIMD instruction processing may be more efficient than an approach in which each channel is processed in a sequential fashion. Although SIMD16 instructions have been described any SIMD instructions may be used.

In another exemplary embodiment, the specialized data layout is constructed off-line and database 150 is pre-populated with the large data set.

Figure 3:
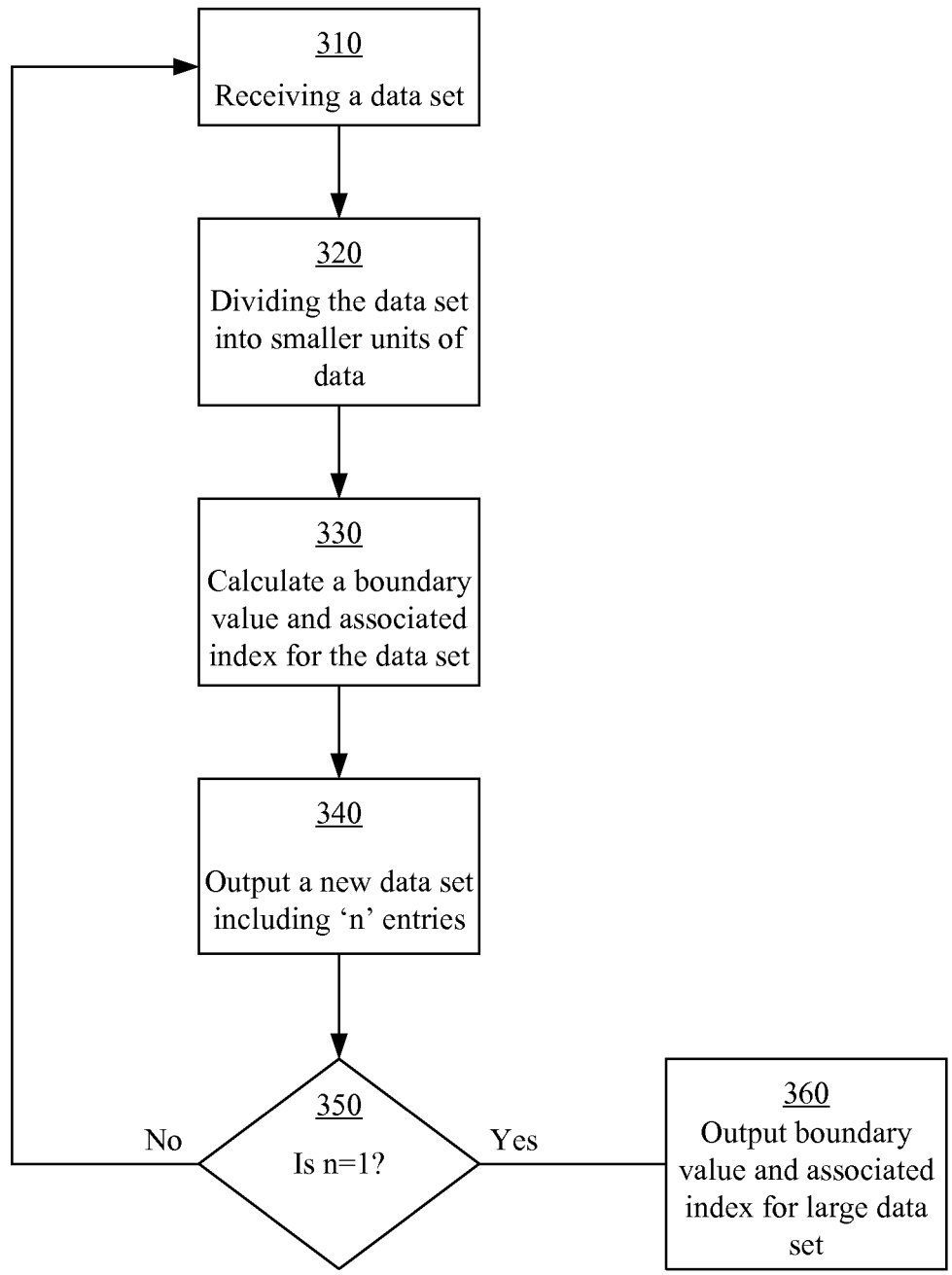
FIG. 3 is a flowchart of an example of a method of determining a boundary data value unit and associated index according to an embodiment.

FIG. 3 shows a method of determining a boundary value data unit, such as, for example, a minimum or maximum data value, in a large data set in parallel with determining an associated index of the determined boundary value data unit to the large data set. The method may generally include continuously determining a boundary value data unit for smaller units of data within the large data set during a plurality of processing stages until a single data unit is produced.

The method may be implemented in executable software as a set of logic instructions stored in a machine- or computer-readable medium of a memory such as random access memory (RAM), read only memory (ROM), programmable ROM (PROM), firmware, flash memory, etc., in configurable logic, such as, for example, programmable logic arrays (PLAs), field programmable gate arrays (FPGAs), complex programmable logic devices (CPLDs), in fixed-functionality hardware using assembly language programming and circuit technology, such as, for example, application specific integrated circuit (ASIC), complementary metal oxide semiconductor (CMOS) or transistor-transistor logic (TTL) technology, or any combination thereof.

At process block 310, a processing stage (e.g., a first processing stage) receives a data set. The data set received by the first processing stage may include the large data set. The data set is divided into a plurality of smaller data sets at process block 320. In a SIMD environment, for example, a large data set including 32 array elements is divided into two sub-arrays, each including 16 array elements, wherein each array element includes the specialized data layout illustrated in FIG. 2B.

In the example, the large data set is divided into units to ensure that SIMD instructions (e.g., a SIMD16 instruction) may be used to process as many data units as possible in parallel to enhance the performance of the system. Any SIMD configuration may be used.

At process block 330, a boundary value data unit is determined between sets of the smaller data sets concurrent with determining its associated index. For example, a minimum data value may be determined for each data channel (i.e. array element) between the first and second sub-arrays.

Each sub-array includes sixteen array elements, and using a SIMD16 instruction, such as, for example, min(16) minArray[0:15] sub-array1[0:15] sub-array2[16:31], the minimum data values between sixteen sets of data, such as, for example, set(0) sub-array1[0], subarray2[0]; set(1) sub-array1[1], sub-array2[1]; set(2) sub-array1[2], sub-array2[2]; set(3) sub-array1[3], sub-array2[3]; set(4) sub-array1[4], sub-array2[4]; set(5) sub-array1[5], sub-array2[5]; set(6) sub-array1[6], sub-array2[6]; and set (15) sub-array1[15], sub-array2[15] may be determined in parallel.

The index value for each minimum data value determined between each set of data in sub-array1 and sub-array2 is included in the resulting data set. Since the index value of each data value is appended to the data value, consistent with the specialized data layout for each entry, when the minimum value is determined, the index of that value is also determined. The index value is located in the least significant bits of the minimum data value.

The minimum data values between each set of data are stored as a new data set including sixteen array elements. Each array element includes the minimum data value between the corresponding sets and the associated index of the data value. The new data set is output at process block 340.

At process block 350, the method determines if the data set includes a single entry (i.e. array element). In this example, n=16. Since n is not equal to 1, the method continues to the next hierarchical stage of processing. The next hierarchical stage of processing performs processing of process blocks 310-340.

For example, the second stage of processing receives the data set including 16 array elements. The data set is divided into two sub-arrays each including eight array elements. Now that the large data set is divided into sub-arrays including eight data channels, SIMD8 instructions may be used to determine a boundary data value of the new data set.

Using a SIMD8 instruction, such as, for example, min(8) minArray[0:7] sub-array1[0:7] sub-array2[8:15], the minimum data values between eight sets of data, such as, for example, set(0) sub-array1[0], sub array2[0]; set(1) sub-array1[1], sub-array2[1]; set(2) sub-array1[2], sub-array2[2]; set(3) sub-array1[3], sub-array2[3]; set(4) sub-array1[4], sub-array2[4]; set(5) sub-array1[5], sub-array2[5], set(6) sub-array1[6], sub-array2[6] and set(7) sub-array1[7], sub-array2[7] may be determined in parallel.

The minimum data values between each set of data are stored as a new data set including eight array elements. Each array element includes the minimum data value between the corresponding sets and the associated index of the data value. The new data set is output at process block 340. At process block 350, n=8.

The third stage of processing receives the data set including eight array elements. The data set is divided into two sub-arrays each including four array elements. Now that the large data set is divided into sub-arrays including four data channels, SIMD4 instructions may be used to determine a boundary data value of the new data set.

Using a SIMD4 instruction, such as, for example, min(4) minArray[0:3] sub-array1[0:3] sub-array2[4:7], the minimum data values between four sets of data, such as, for example, set(0) sub-array1[0], sub array2[0]; set(1) sub-array1[1], sub-array2[1]; set(2) sub-array1[2], sub-array2[2];

set(3) sub-array1[3], sub-array2[3]; and set(4) sub-array1[4], sub-array2[4] may be determined in parallel.

The minimum data values between each set of data are stored as a new data set including four array elements. Each array element includes the minimum data value between the corresponding sets and the associated index of the data value. The new data set is output at process block 340. At process block 350, n=4.

The fourth processing stage receives the data set including four array elements. The data set is divided into two sub-arrays each including two array elements. Now that the large data set is divided into sub-arrays including two data channels, SIMD2 instructions may be used to determine a boundary data value of the new data set.

Using a SIMD2 instruction, such as, for example, min(2) minArray[0:1] sub-array1[0:1] sub-array2[2:3], the minimum data value between two sets of data, such as, for example, set(0) sub-array1[0], subarray2[0] and set(1) sub-array1[1], sub-array2[1] may be determined in parallel.

The minimum data values between each set of data are stored as a new data set including two array elements. Each array element includes the minimum data value between the corresponding sets and the associated index of the data value. The new data set is output at process block 340. At process block 350, n=2.

The fifth processing stage receives the data set including two array elements. The data set is divided into two sub-arrays each including one array element. Now that the large data set is divided into sub-arrays including one data channel, SIMD 1 instructions may be used to determine a boundary data value of the new data set.

Using a SIMD1 instruction, such as, for example, min(1) minArray[0] sub-array1[0] sub-array2[1], the minimum data value between a single set of data, such as, for example, set(0) sub-array1[0], subarray2[0] may be determined in parallel.

At the completion of the fifth processing stage, the minimum data value between the set of data includes a single array element. Accordingly, at process block 350, n=1 and the single entry is output to process block 360. The most significant bits of the entry include the boundary data value of the single entry and the least significant bits of the entry include the index of the value. The boundary data value of the single entry represents the boundary data value for the overall large data set.

The method may determine the associated index value of a boundary data value unit in parallel with determining the boundary data value unit for the overall large data set since the specialized data layout of the data entries includes the data value and its associated index combined into a single entry. Once the boundary data value is determined for the overall large data set, its index is stored as the least significant bits of the entry.

In an exemplary embodiment, when there are insufficient bits to hold all the indices in the new data layout, the data set may be divided into several smaller groups such that all data in the same group may be represented by the specialized data layout. First, the boundary data values and indices for each group are calculated according to FIG. 3. Then the indices in the resulting data are replaced by a group index to form a new set of data. The new set of data is processed according to FIG. 3 to obtain an overall boundary data value and corresponding group index. From the group index, the boundary data value and index in that group may be retrieved to derive the global data index.

Figure 4B:
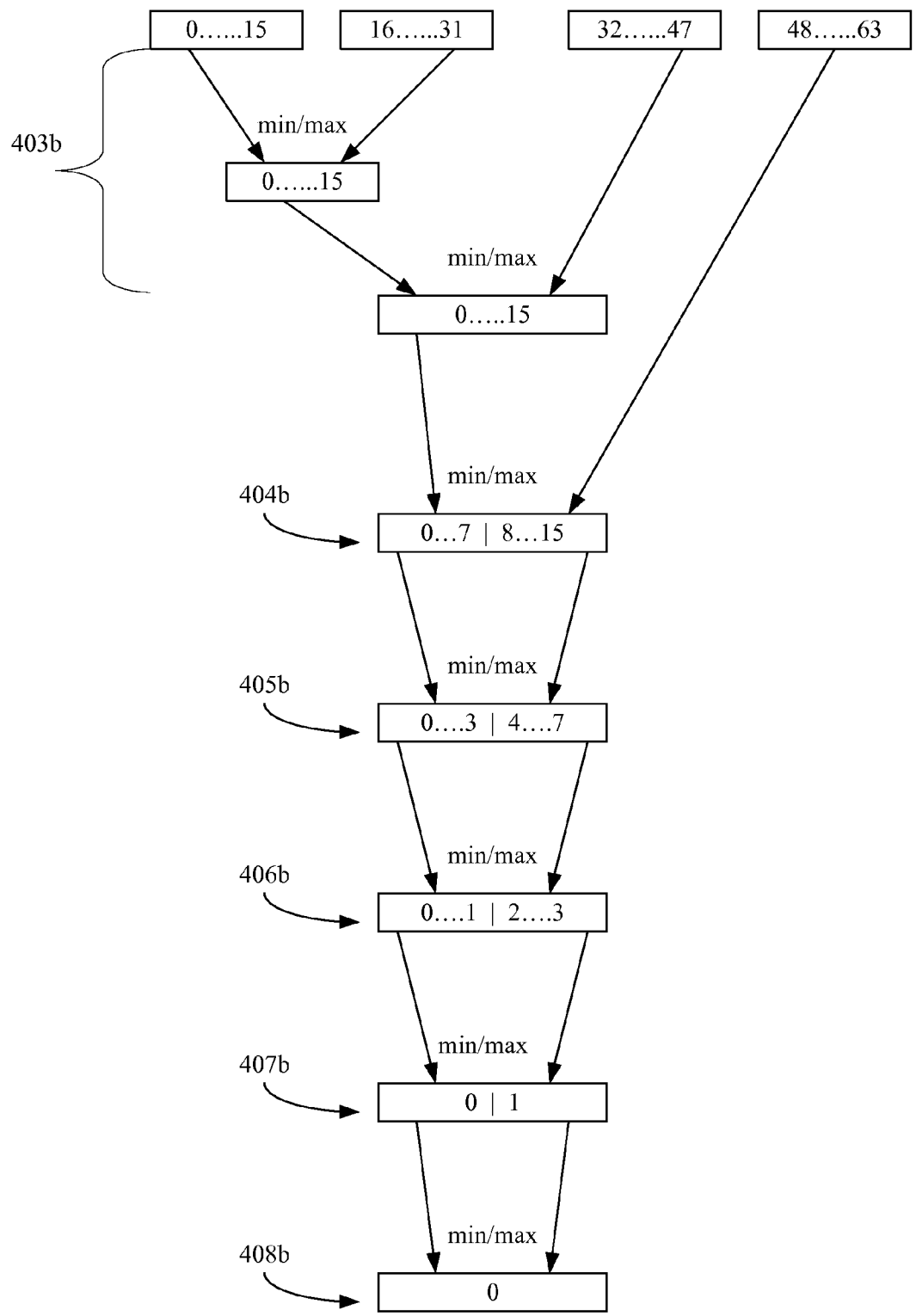

FIG. 4A shows SIMD instruction listings to perform operations using the specialized data layout for an approach to determining a boundary value data unit, such as, for example, a minimum or maximum data value, in a large data set in parallel with determining an associated index of the determined boundary value data unit into the large data set in a SIMD environment, including determining a boundary value data unit for smaller units of data within the large data set during a plurality of processing stages until a single data unit is produced. FIG. 4B is an exemplary block diagram of how the corresponding instructions and operations in FIG. 4A are performed.

Generally, an initialization portion 401*a* may provide for initializing an array dataIndexArray [N]; minArray [16] and maxArray [16], where N=16. Listing 402*a* illustrates two SIMD 16 instructions for finding the minimum and maximum data value for each data channel between two arrays and stores the results in minArray[0:15] and maxArray[0:15] accordingly.

Listing 403*a* illustrates pseudo code for determining the minimum and maximum data value of a large data set having an array size greater than thirty-two array elements and a multiple of sixteen. For example, in FIG. 4B, reference 403*b* illustrates the minimum and maximum operations performed on smaller sections of a large data set including sixty-four array elements. Initially, minimum and maximum data array values are determined between array elements [0:15] and [16:31]. At a first iteration of the pseudo code at 403*a* (i.e. i=2, N=64), the results are compared with array elements [32:47] to determine the minimum and maximum data array values between array elements [0:47].

The results of the first iteration are compared with array elements [48:63] at a second iteration of the pseudo code (i.e. i=3) to determine the minimum and maximum data array values between array elements [0:63]. The resulting data arrays are minArray [0:15] and maxArray [0:15]. Each array includes sixteen array elements.

Listing 404*a* illustrates SIMD instructions (i.e. SIMD8 instructions) for determining the minimum and maximum data array values in a large data set when the large data set is divided into two sub-arrays, each including eight data array elements. Reference 404*b* illustrates this configuration.

Listing 405*a* illustrates the SIMD instructions (i.e. SIMD 4 instructions) for determining the minimum and maximum data array values in a large data set when the large data set is divided into two sub-arrays, each including four data array elements. Reference 405*b* illustrates this configuration.

Listing 406*a* illustrates the SIMD instructions (i.e. SIMD2 instructions) for determining the minimum and maximum data array values in a large data set when the large data set is divided into two sub-arrays, each including two data array elements. Reference 406*b* illustrates this configuration.

Listing 407*a* illustrates the SIMD instructions (SIMD1 instruction) for determining the minimum and maximum data array values in a large data set when the large data set is divided into two sub-arrays, each including one data array element. Reference 407*b* illustrates this configuration.

Listing 408*a* and Reference 408*b* illustrate the resulting single entry array element, which includes the overall minimum or maximum data value for the large data set and its associated index into the large data set.

Figure 5:
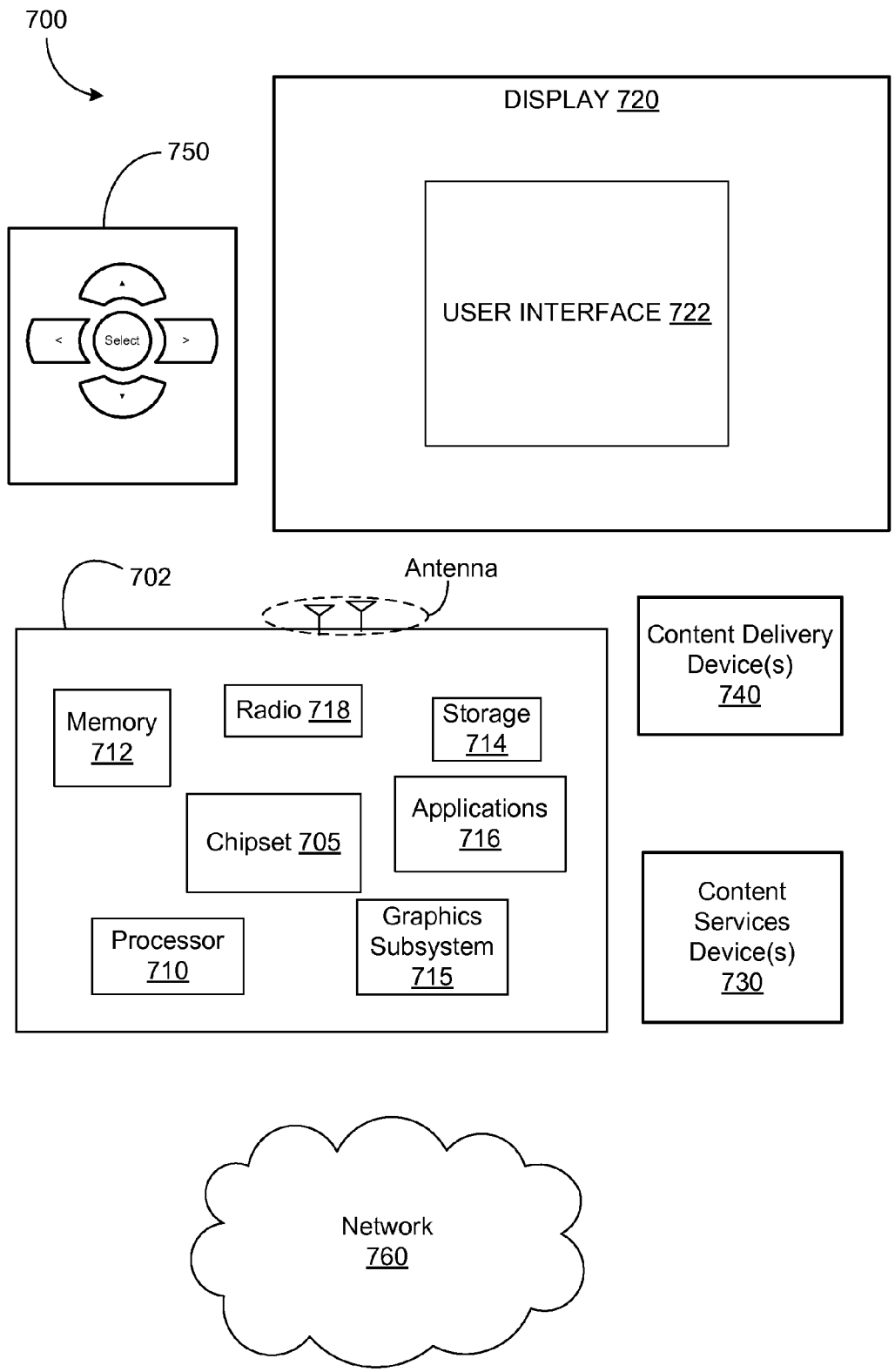
FIG. 5 is a block diagram of a system according to an embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720.

Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off" In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
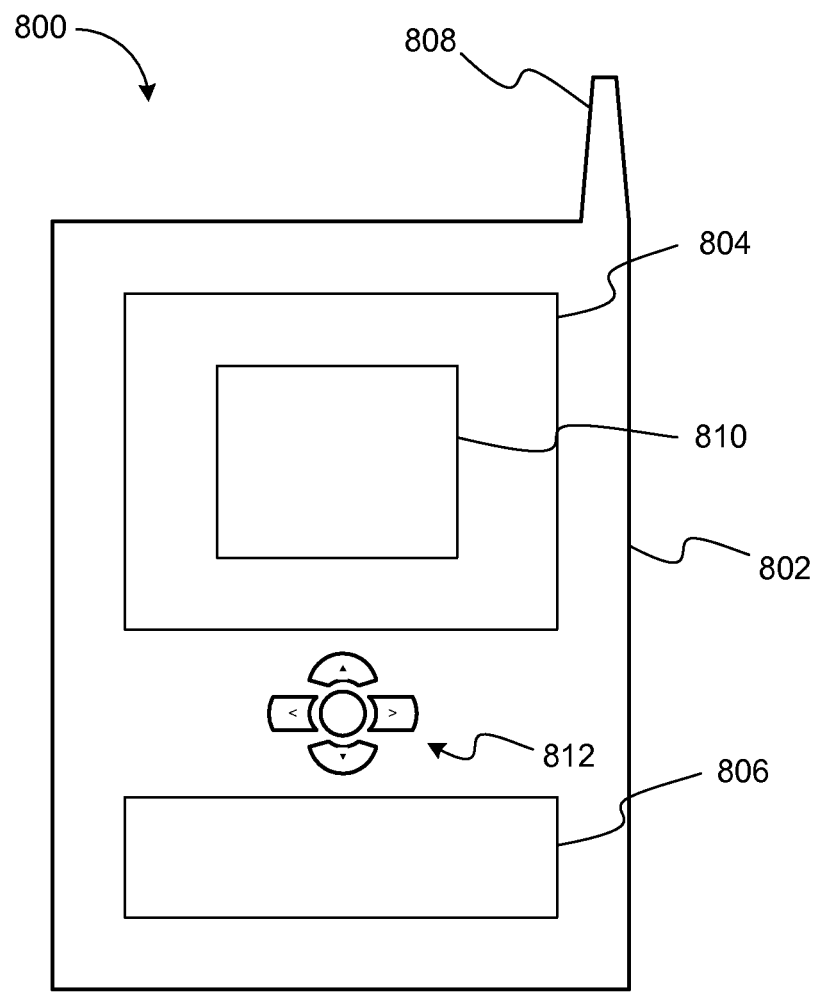
FIG. 6 is a diagram of a device according to an embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Additional Examples and Notes

Example 1 may provide for a method that includes determining a boundary value data unit in a large data set in parallel with determining an associated index of the determined boundary value data unit into the large data set by continuously determining a boundary value data unit of smaller sets of data within the large data set during a plurality of processing stages performed in a hierarchical manner until a single data unit is produced, wherein each data set includes a plurality of data entries.

Example 2 may include the method of example 1, further including combining a data value and an associated index of the data value into a single data unit, and storing the single data unit as a data entry in the large data set.

Example 3 may include the method of example 1, wherein each processing stage determines a boundary value data unit between sets of the smaller sets of data in parallel with determining an associated index of the determined value into the large data set.

Example 4 may include the method of example 3, wherein determining the boundary value data unit between sets of the smaller sets of data includes performing operations on the data entries in each data set in parallel using single instruction multiple data (SIMD) instructions.

Example 5 may include the method of example 4, wherein an output of each processing stage produces a data set which is received as a new data set input to a next processing stage.

Example 6 may include the method of example 1, wherein a first processing stage receives the large data set as a data set input.

Example 7 may include the method of example 1, wherein the large data set is stored as a structured array in a database.

Example 8 may include the method of example 1, wherein the boundary value data unit is one of a minimum value data unit and a maximum value data unit.

Example 9 may include a system comprising a determination module to determine a boundary value data unit in a large data set in parallel with determining an associated index of the determined boundary value data unit into the large data set.

Example 10 may include the system of example 9, further comprising a combination module to combine a data value and an associated index of the data value into a single data unit, and store the single data unit as a data entry in the large data set.

Example 11 may include the system of example 10, wherein the determination module is to determine a boundary value data unit in a large data set in parallel with determining an associated index of the determined boundary value data unit into the large data includes continuously determining a boundary value data unit of smaller sets of data within the large data set during a plurality of processing stages performed in a hierarchical manner until a single data unit is produced.

Example 12 may include the system of example 11, wherein each processing stage receives a set of data and divides the set of data into a plurality of smaller data sets, wherein each data set includes a plurality of data entries.

Example 13 may include the system of example 12, wherein each processing stage determines a boundary value data unit between sets of the smaller data sets in parallel with determining an associated index of the determined value into the large data set.

Example 14 may include the system of example 13, wherein the determining a boundary value data unit between sets of the smaller data sets includes performing operations on the data entries in each data set in parallel using single instruction multiple data (SIMD) instructions.

Example 15 may include the system of example 14, wherein an output of each processing stage produces a data set which is received as a new data set input to the next processing stage.

Example 16 may include the system of example 9, wherein the boundary value data unit is one of a minimum value data unit and a maximum value data unit.

Example 17 at least one computer readable medium comprising instructions, which if executed by a processor, cause a computer to determine a boundary value data unit in a large data set in parallel with determining an associated index of the determined boundary value data unit into the large data set.

Example 18 may include the at least one computer readable medium of example 17, further comprising instructions, which if executed by a processor, cause a computer to combine a data value and an associated index of the data value into a single data unit, and store the single data unit as a data entry in the large data set.

Example 19 may include the at least one computer readable medium of example 18, wherein the instructions, if executed by a processor, causing the computer to determine a boundary value data unit in a large data set in parallel with determining an associated index of the determined boundary value data unit into the large data includes continuously determining a boundary value data unit of smaller sets of data within the large data set during a plurality of processing stages performed in a hierarchical manner until a single data unit is produced.

Example 20 may include the at least one computer readable medium of example 19, wherein each processing stage receives a set of data and divides the set of data into a plurality of smaller data sets, wherein each data set includes a plurality of data entries.

Example 21 may include the at least one computer readable medium of example 20, wherein each processing stage determines a boundary value data unit between sets of the smaller data sets in parallel with determining an associated index of the determined value into the large data set.

Example 22 may include the at least one computer readable medium of example 21, wherein the determining a boundary value data unit between sets of the smaller data sets of the smaller data sets includes performing operations on the data entries in each data set in parallel using single instruction multiple data (SIMD) instructions.

Example 23 may include the at least one computer readable medium of example 22, wherein an output of each processing stage produces a data set which is received as a new data set input to the next processing stage and a first processing stage receives the large data set as a data set input.

Example 24 may include the at least one computer readable medium of example 17, wherein the large data set is stored as a structured array in a database.

Example 25 may include the at least one computer readable medium system of example 17, wherein the boundary value data unit is one of a minimum value data unit and a maximum value data unit.

Examples may also include an apparatus including means for performing the method of any one of examples 1 to 8.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
    determining, at least partly by one or more of configurable to is or fixed-functionality hardware, a boundary value data unit in a large data set in parallel with determining an associated index of the determined boundary value data unit into the large data set by continuously determining a boundary value data unit of smaller sets of data within the large data set during a plurality of processing stages performed in a hierarchical manner until a single data unit is produced, wherein each data set includes a plurality of data entries, wherein each processing stage determines a boundary value data unit between sets of the smaller sets of data,
    wherein determining the boundary value data unit between sets of the smaller set of data includes performing operations on the data entries in each dataset in parallel with one another.

2. The method of claim 1, further comprising:
    combining a data value and an associated index of the data value into a single data unit, and storing the single data unit as a data entry in the large data set.

3. The method of claim 1, wherein each processing stage determines a boundary value data unit between sets of the smaller sets of data in parallel with determining an associated index of the determined value into the large data set.

4. The method of claim 3, wherein determining the boundary value data unit between sets of the smaller set of data includes performing operations on the data entries in each dataset in parallel uses single instruction multiple data (SIMD) instructions that are executed on a circuit comprising a SIMD processor.

5. The method of claim 4, wherein an output of each processing stage produces a data set which is received as a new data set input to a next processing stage.

6. The method of claim 1, wherein a first processing stage receives the large data set as a data set input.

7. The method of claim 1, wherein the large data set is stored as a structured array in a database.

8. The method of claim 1, wherein the boundary value data unit is one of a minimum value data unit and a maximum value data unit.

9. A system comprising:
a determination module, implemented at least partly in one or more of configurable logic or fixed-functionality hardware, to determine a boundary value data unit in a large data set in parallel with determining an associated index of the determined boundary value data unit into the large data set, and to continuously determine a boundary value data unit of smaller sets of data within the large data set during a plurality of processing stages performed in a hierarchical manner until a single data unit is produced, wherein each processing stage is to determine a boundary value data unit between sets of the smaller sets of data,
wherein determining the boundary value data unit between sets of the smaller set of data includes performing operations on the data entries in each dataset in parallel with one another.

10. The system of claim 9, further comprising:
a combination module to combine a data value and an associated index of the data value into a single data unit, and store the single data unit a data entry in the large data set.

11. The system of claim 10, wherein each processing stage is to receive a set of data and divides the set of data into a plurality of smaller data sets, wherein each data set includes a plurality of data entries.

12. The system of claim 11, wherein each processing stage is to determine a boundary value data unit between sets of the smaller data sets in parallel with determining an associated index of the determined value into the large data set.

13. The system of claim 12, wherein the determining a boundary value data unit between sets of the smaller data sets is to include performing operations on the data entries in each data set in parallel using single instruction multiple data (SIMD) instructions that are to be executed on a circuit comprising a SIMD processor.

14. The system of claim 13, wherein an output of each processing stage is to produce a data set which is received as a new data set input to the next processing stage.

15. The system of claim 9, wherein the boundary value data unit is one of a minimum value data unit and a maximum value data unit.

16. At least one non-transitory computer readable medium comprising instructions, which if executed by a processor, cause a computer to:
determine a boundary value data unit in a large data set in parallel with determining an associated index of the determined boundary value data unit into the large data set;
continuously determine a boundary value data unit of smaller sets of data within the large data set during a plurality of processing stages performed in a hierarchical manner until a single data unit is produced, wherein each processing stage is to determine a boundary value data unit between sets of the smaller sets of data; and
perform operations on the data entries in each dataset in parallel with one another.

17. The at least one computer readable medium of claim 16, further comprising instructions, which if executed by a processor, cause a computer to:
combine a data value and an associated index of the data value into a single data unit, and store the single data unit as a data entry in the large data set.

18. The at least one computer readable medium of claim 17, wherein each processing stage receives a set of data and divides the set of data into a plurality of smaller data sets, wherein each data set includes a plurality of data entries.

19. The at least one computer readable medium of claim 18, wherein each processing stage determines a boundary value data unit between sets of the smaller data sets in parallel with determining an associated index of the determined value into the large data set.

20. The at least one computer readable storage medium of claim 19, wherein the determining a boundary value data unit between sets of the smaller data sets of the smaller data sets includes performing operations on the data entries in each data set in parallel using single instruction multiple data (SIMD) instructions that are executed on a circuit comprising a SIMD processor.

21. The at least one computer readable medium of claim 20, wherein an output of each processing stage produces a data set which is received as a new data set input to the next processing stage and a first processing stage receives the large data set as a data set input.

22. The at least one computer readable medium of claim 16, wherein the large data set is stored as a structured array in a database.

23. The at least one computer readable medium of claim 16, wherein the boundary value data unit is one of a minimum value data unit and a maximum value data unit.

* * * * *